(12) United States Patent
Steele

(10) Patent No.: US 10,605,201 B2
(45) Date of Patent: Mar. 31, 2020

(54) GAS TURBINE EXHAUST COOLING SYSTEM

(71) Applicant: ROLLS-ROYCE plc, London (GB)

(72) Inventor: David Steele, Bristol (GB)

(73) Assignee: Rolls-Royce plc (GB)

( * ) Notice: Subject to any disclaimer, the term of this patent is extended or adjusted under 35 U.S.C. 154(b) by 341 days.

(21) Appl. No.: 15/629,936

(22) Filed: Jun. 22, 2017

(65) Prior Publication Data

US 2018/0119642 A1    May 3, 2018

(30) Foreign Application Priority Data

Jun. 23, 2016  (GB) .................................. 1610958.9

(51) Int. Cl.
| | | |
|---|---|---|
| *F02K 1/82* | (2006.01) | |
| *F02K 3/10* | (2006.01) | |
| *F23R 3/18* | (2006.01) | |
| *F02K 3/08* | (2006.01) | |
| *F02C 7/18* | (2006.01) | |
| *F02K 1/06* | (2006.01) | |

(52) U.S. Cl.
CPC ............... *F02K 1/822* (2013.01); *F02C 7/18* (2013.01); *F02K 1/06* (2013.01); *F02K 3/08* (2013.01); *F02K 3/10* (2013.01); *F23R 3/18* (2013.01); *F05D 2220/32* (2013.01); *F05D 2260/201* (2013.01); *Y02T 50/675* (2013.01)

(58) Field of Classification Search
CPC ... F02K 1/822; F02K 1/12; F02K 1/28; F02K 1/38; F02K 1/46; F02K 3/08; F02K 3/10; F02C 7/18; F23R 3/18
See application file for complete search history.

(56) References Cited

U.S. PATENT DOCUMENTS

| | | | |
|---|---|---|---|
| 2,853,854 A | | 9/1958 | Avery et al. |
| 3,780,827 A | * | 12/1973 | Straight .................... F02K 1/38 |
| | | | 181/216 |
| 4,372,110 A | * | 2/1983 | Fletcher .................. F02K 1/386 |
| | | | 181/213 |

(Continued)

FOREIGN PATENT DOCUMENTS

EP    1961944    8/2008

OTHER PUBLICATIONS

European Search Report dated Nov. 2, 2017, issued in EP Patent Application No. 17174935.

(Continued)

*Primary Examiner* — Craig Kim
(74) *Attorney, Agent, or Firm* — Barnes & Thornburg LLP

(57) ABSTRACT

A gas turbine engine (10) comprises a main fluid flow exhaust nozzle (30) bounding a main fluid flow path, and a cooling nozzle (38) provided upstream of the main fluid flow exhaust nozzle (30) in the main fluid flow path. The cooling nozzle (38) is arranged to provide cooling air to a surface (36) of the main fluid flow exhaust nozzle (30), the cooling nozzle (38) comprises first and second outlets (44, 46). The first outlet (44) is located adjacent the main fluid flow exhaust nozzle surface (36) and is spaced from the main fluid flow path by the second outlet (46). The second outlet (46) comprises a convergent divergent nozzle configured to accelerate cooling air exhausted from the second outlet (46) to a velocity greater than air exhausted from the first outlet (44).

10 Claims, 1 Drawing Sheet

(56) References Cited

U.S. PATENT DOCUMENTS

| | | | |
|---|---|---|---|
| 4,544,098 A | 10/1985 | Warburton | |
| 5,586,431 A | 12/1996 | Thonebe et al. | |
| 6,164,059 A | 12/2000 | Liang et al. | |
| 6,295,805 B1 | 10/2001 | Lackey et al. | |
| 2006/0096272 A1* | 5/2006 | Baughman | F01D 5/022 60/232 |
| 2009/0169359 A1 | 7/2009 | Murphy et al. | |
| 2012/0167549 A1* | 7/2012 | Lariviere | F02C 9/20 60/204 |

OTHER PUBLICATIONS

Great Britain Search Report dated Dec. 1, 2016, issued in GB Patent Application No. 1610958.9.

* cited by examiner

GAS TURBINE EXHAUST COOLING SYSTEM

BACKGROUND OF THE INVENTION

The present disclosure concerns a gas turbine engine comprising an exhaust cooling system.

Components of aircraft gas turbines engines such as turbojets and turbofans typically reach high temperatures, and so may require cooling in order to prevent damage to components. In particular, gas turbine engines having afterburners (also known as "reheat") may require cooling of the exhaust nozzle, to prevent damage to the nozzle itself.

One prior gas turbine exhaust nozzle comprises a cooling channel which surrounds the gas turbine engine core in an annular arrangement (known as a "skirted ring"). Cooling air is provided from a compressor or bypass duct to the channel, which is then exhausted on to a downstream internal cooled surface of the core exhaust nozzle. The cooling air provides a cooling film, which shields the cooled surface from hot exhaust gasses. However, turbulence induced by shear from the relatively slow moving cooling air and the relatively fast (generally supersonic) core exhaust flow causes mixing between the flows, thereby reducing the effectiveness of the cooling. Even where the cooling airflow is provided at high velocity, a relatively slow moving boundary layer is formed adjacent the cooled surface. This slow moving boundary air again interacts with the fast moving core exhaust flow, thereby again causing mixing.

A second prior nozzle comprises a cooling channel contained within the nozzle itself. Small holes are provided which extend into the gas turbine engine core flow. Cooling air thereby leaks out in the main core flow, thereby providing effusion cooling. However, such a system results in a high pressure loss in view of the resistance to flow provided by the relatively small cooling holes. The cooling holes are expensive to manufacture, and are prone to blockages. Furthermore, since the cooling flow enters the main core flow generally normal to the core flow direction, the cooling flow does not contribute to aircraft thrust. Consequently, there is a need for an improved aircraft gas turbine engine exhaust nozzle cooling arrangement which addresses one or more of the above problems.

BRIEF SUMMARY OF THE DISCLOSURE

According to a first aspect of the invention there is provided a gas turbine engine comprising:

a core fluid flow exhaust nozzle bounding a core fluid flow path; and a cooling nozzle provided upstream of the core fluid flow exhaust nozzle in the core fluid flow path and arranged to provide cooling air to a surface of the core fluid flow exhaust nozzle, the cooling nozzle comprising first and second outlets, the first outlet being adjacent the core fluid flow exhaust nozzle surface and being spaced from the core fluid flow path by the second outlet, the second outlet comprising a convergent divergent nozzle configured to accelerate cooling air exhausted from the second outlet to a velocity greater than air exhausted from the first outlet.

Advantageously, by spacing the first outlet from the main fluid flow path by a second outlet, and by accelerating the second outlet exhaust cooling flow to a higher velocity than the first outlet cooling flow, shear interaction between the flows is minimised, thereby preventing mixing, and so increasing cooling flow effectiveness. Consequently, a lower cooling mass flow can be provided, which increases gas turbine engine efficiency. Alternatively or in addition, a longer surface can be cooled by the same cooling mass flow.

The cooling nozzle may comprise a third outlet provided between the first and second outlets, the third outlet being configured to exhaust air at a velocity less than the second outlet, and greater than the first outlet. The third outlet may comprise a convergent divergent nozzle configured to accelerate cooling air exhausted from the third outlet to a velocity greater than air exhausted from the first outlet, and less than air exhausted from the second outlet. The second and third outlets may each comprise a respective divergent section downstream of a convergent section. The divergent section of the second outlet may diverge to a greater degree than the divergent section of the third outlet.

The first outlet may comprise a restrictor configured to restrict outlet velocity of the first outlet to a velocity lower than at least the outlet velocity of the second outlet.

The main fluid flow exhaust nozzle may be annular, and may comprise a variable area nozzle. The cooling nozzle may be annular, and may be configured to provide cooling to an annularly inner surface of the main fluid flow exhaust nozzle. At least one of the outlets of the cooling nozzle may have a variable geometry.

The cooling nozzle may be configured to provide an outlet flow generally parallel to the main core flow.

The skilled person will appreciate that except where mutually exclusive, a feature described in relation to any one of the above aspects of the invention may be applied mutatis mutandis to any other aspect of the invention.

BRIEF DESCRIPTION OF THE SEVERAL VIEWS OF THE DRAWINGS

An embodiment of the invention will now be described by way of example only, with reference to the Figures, in which.

DETAILED DESCRIPTION

Figure 1:
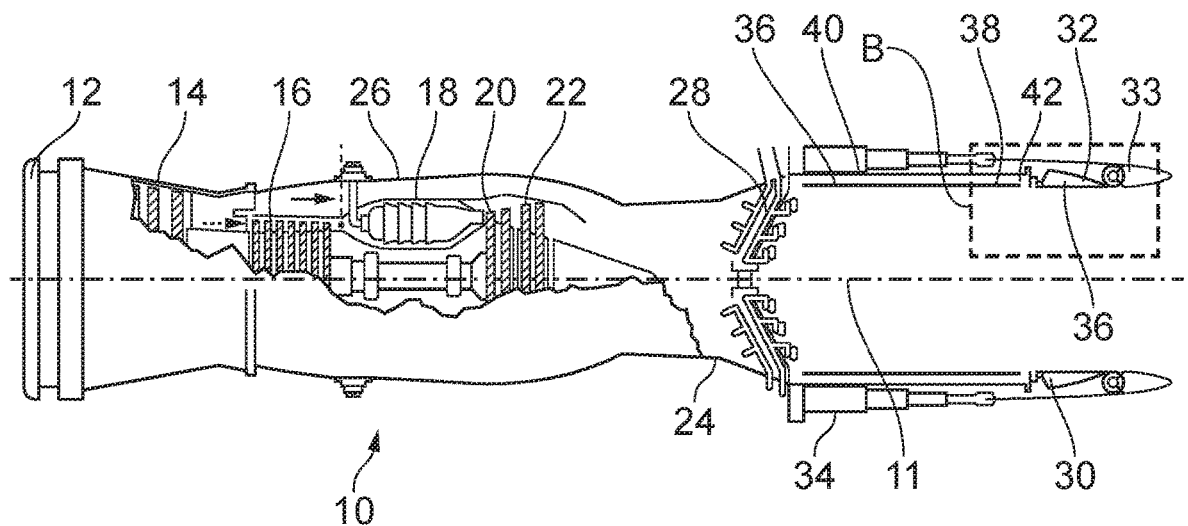
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 14, a compressor 16, combustion equipment 18, a high-pressure turbine 20, a low-pressure turbine 22 and an exhaust nozzle 20. A nacelle 21 generally surrounds the engine 10 and defines both the intake 12 and a mixing duct 24.

The gas turbine engine 10 works in the conventional manner so that air entering the intake 12 is accelerated by the fan 14 to produce two air flows: a first air flow (shown by a dotted arrow in FIG. 1) into the compressor 16 and a second air flow (shown by a solid arrow in FIG. 1) which passes through a bypass duct 26 to provide propulsive thrust. The compressor 16 compresses the air flow directed into it before delivering that air to the combustion equipment 18 where it is mixed with fuel and the mixture combusted. The resultant hot combustion products then expand through, and thereby drive the high and low-pressure turbines 20, 22 before being exhausted through the mixing duct, where it is mixed with bypass flow from the bypass duct 26 to provide additional propulsive thrust. The high and low pressure turbines 20, 22 drive respectively the compressor 16 and fan 14, each by a suitable interconnecting shaft (not shown).

Downstream of the mixing duct 24 is further combustion equipment in the form of an afterburner (also known as "reheat") which comprises fuel injectors 28. The fuel injectors 28 add further fuel to the mixed exhaust stream downstream of the fan bypass flow and turbines 20, 22, to further raise the temperature and pressure of the exhaust, when operated.

Downstream of the afterburner 28 is a main gas flow exhaust nozzle 30. The exhaust nozzle 30 is generally annular, and contains gasses as they combust, and accelerates those gasses to provide thrust. In order to efficiently provide thrust and manage backpressure at various operating conditions (such as engine mass flow and external atmospheric pressure), the nozzle 30 comprises variable geometry features in the form of pivotable vanes 32, 33 which control the outlet area of the nozzle 30 by pivoting inwardly and outwardly. The position of the vanes 32 is controlled by actuators 34 in the form of hydraulic rams. The vanes 32, 33 may pivot relative to one another, in addition to pivoting relative to the remainder of the engine.

The nozzle 30 comprises an annularly inner surface 36, which extends parallel to the longitudinal axis 11, and is in contact with the hot main gas flow of the engine. Consequently, the inner surface 36 requires cooling, to prevent damage to the nozzle. Cooling for the surface 36 is provided by a cooling channel 38 (shown in more detail in FIG. 2), which provides cooling air sourced from one or more of the compressor 16, the bypass stream, or from atmospheric air. The cooling channel 38 is annular, and is provided radially outwardly of the inner surface 36. The cooling channel 38 is defined by an annular space between the inner surface 36 and an outer casing 40. Consequently, the cooling channel 38 carries air in use having a lower velocity than the main gas flow (i.e. air flowing through the exhaust nozzle 30 bounded by the inner surface 36) when the afterburner is in operation.

The cooling channel 38 runs parallel to the longitudinal axis 11, and so parallel to the direction of the main gas flow. An outlet nozzle 42 is provided at a downstream end of the cooling channel 38, which directs air out of the cooling channel 38 in a generally longitudinal direction, parallel to the main gas flow, and against the cooled surface 38 downstream of the nozzle 42. The outlet is provided downstream of the afterburner fuel injectors 28, but upstream in the main gas flow path of the main gas flow exhaust nozzle 30. Consequently, air exhausted from the cooling channel 38 impinges on the radially inner surface 36 of a downstream end of the nozzle 30, in particular, the pivotable vanes 32.

Figure 2:
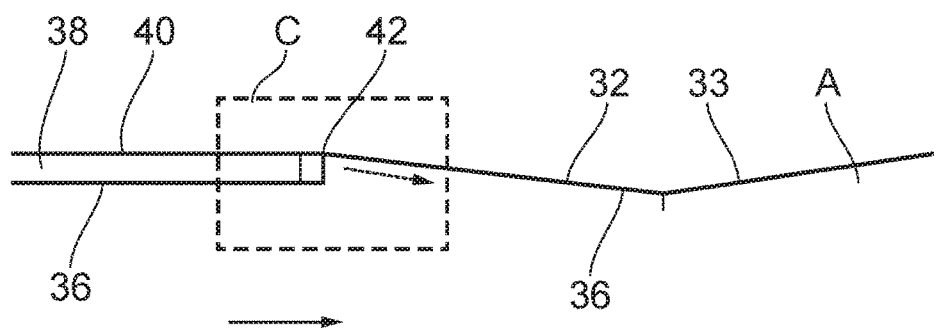
FIG. 2 is a sectional side view of the part of the gas turbine shown in box B of FIG. 1.

FIG. 2 shows the area shown in box B of FIG. 1 in more detail. As can be seen, an outlet flow (shown by the dotted arrow) is provided by the outlet nozzle 42, which extends in a direction generally parallel to the internal surface of the exhaust nozzle 30, in particular the vanes 32, 33. A gradually thickening boundary layer A of relatively slow moving air is formed adjacent the internal surface on the vanes 32, 33 as a result of skin friction slowing the cooling air from the cooling channel 38 as the air progresses along the surface 36. On the other hand, the main gas flow (shown by the solid arrow in FIG. 2) continues as relatively high velocity (generally supersonic velocity as it approaches the exhaust nozzle outlet).

Figure 3:
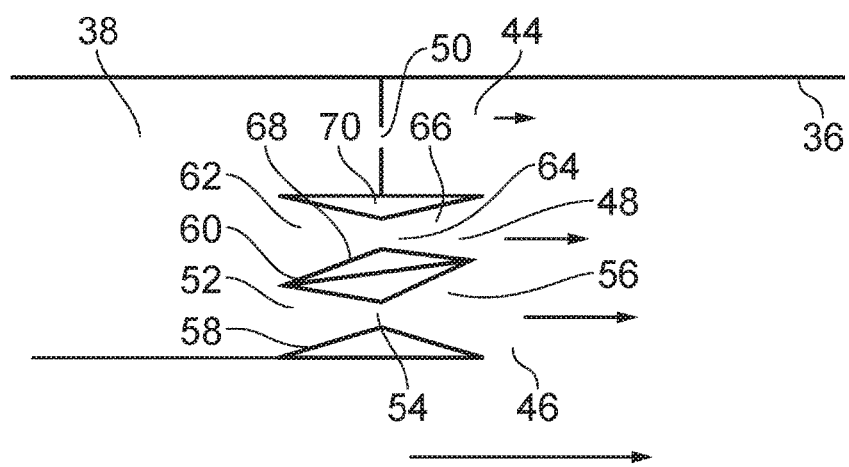
FIG. 3 is a sectional side view of the part of the gas turbine engine in box C of FIG. 2.

FIG. 3 shows the outlet nozzle 42 in more detail. The nozzle 42 comprises first, second and third outlets in the form of first, second and third ducts 44, 46, 48.

The first outlet duct 44 is provided adjacent the radially inner surface 36 of the main gas flow exhaust nozzle 30. The first outlet duct 44 comprises a restrictor plate 50, which comprises an aperture configured to throttle airflow through the first outlet 44, to thereby reduce the mass flow and velocity of air exiting the first outlet 44.

The second outlet duct 46 is provided radially inwardly of the first outlet 44, and airflow from the second outlet 46 thereby spaces airflow from the first outlet 44 from the main gas flow. Second outlet duct 46 comprises a convergent-divergent duct comprising, in fluid flow series a convergent section 52, a throat 54 and a divergent section 56.

The convergent section 52 is formed from radially inner and outer walls 58, 60, which converge from a relatively large inlet area to a relatively small throat area, and thereby accelerates the subsonic flow within the channel 38. The convergent section 52 and throat 54 are dimensioned such that flow is accelerated to approximately Mach 1 (i.e. is "choked") at the throat 54. It will be understood by the skilled person that the necessary dimensions will be dependent on the flow conditions at the entrance to the convergent section 52. For example, if the flow at the entrance to the convergent section has a velocity of approximately 0.5 Mach, a convergent section area ratio (i.e. the ratio between inlet area at the entrance to the convergent section and the area at the throat) of 2:1 will be necessary.

At or slightly upstream of the throat 54, the flow conditions change from sub-sonic to supersonic. Consequently, as will be understood by the skilled person, the air at the throat 54 behaves as a compressible fluid, rather than an incompressible fluid. At the divergent portion 56, the walls 58, 60 of the second duct 56 diverge, i.e. the area at the downstream end of the second duct 56 is greater than the area at the throat 54. Consequently, the fluid within the divergent portion expands, and thereby is reduced in pressure. Simultaneously, the fluid is accelerated, and thereby leaves the second outlet 56 at a greater velocity than at the entrance to the second outlet 56. It will be understood that it will be desirable for the divergence angle to be such that flow does not separate from the walls 58, 60, and that the area ratio of the divergent section is such that the pressure where the fluid leaves the second duct 46 is the same or greater than the pressure downstream of the outlet 46.

The third outlet duct 48 is similar to the second outlet duct 48, and is provided annularly inwardly of the first outlet duct 44, and annularly outwardly from the second outlet duct 46, such that the outlet flows from the first and second ducts 44, 46 are spaced by the outlet flow from the third outlet duct 48.

The third outlet duct 48 also comprises, in fluid flow, a converging section 62, a throat 64 and a diverging section 66, defined by annularly inner and outer walls 68, 70. The converging section and throat 62, 64 define a similar area ratio to the converging section and throat 52, 54 of the second outlet duct 46, and so fluid flow is similarly accelerated to approximately Mach 1 at the throat. However, the divergent section 66 diverges to a less degree than the divergent section 56 of the second outlet duct 46, and so fluid flow through the third duct 48 is accelerated to a lesser degree than through the second duct 46.

As a result of the arrangement of the outlets 44, 46, 48 of the cooling channel 38, a velocity profile is provided, in which air from the outlet nozzle adjacent the cooled surface 36 travels at a relatively low velocity, with air spaced from the cooled surface travels at a relatively high velocity, and air in between travels at an intermediate velocity. Consequently, less shear interaction takes place compared to a conventional cooling nozzle, and so the cooling or downstream surfaces 36 in the main fluid flow path is more effective.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. It will be understood that the drawings are not to scale.

For example, only two outlet ducts may be provided, with the outlet duct adjacent the main fluid flow having a convergent-divergent duct, and the duct adjacent the cooled surface having a restrictor plate, a plan duct, or a convergent-divergent configured to accelerate airflow therethrough to a less extent (for example, by having a lower divergent section expansion ratio). Similarly, further intermediate duct could be provided, each being configured to accelerate airflow therethrough to an intermediate degree.

The invention claimed is:

1. A gas turbine engine comprising:
   a gas turbine engine core;
   a bypass duct radially outboard of the gas turbine engine core;
   a mixing duct downstream of the gas turbine engine core and the bypass duct, the mixing duct configured to mix first air flowing through the gas turbine engine core and second air flowing through the bypass duct;
   a main fluid flow exhaust nozzle bounding a main fluid flow path; and
   a cooling channel having an inlet configured to receive a portion of the first air and the second air from the mixing duct and an outlet comprising a cooling nozzle;
   the cooling nozzle provided upstream of the main fluid flow exhaust nozzle in the main fluid flow path and arranged to provide cooling air to a surface of the main fluid flow exhaust nozzle, the cooling nozzle comprising first and second outlets, the first outlet being adjacent the main fluid flow exhaust nozzle surface and being spaced from the main fluid flow path by the second outlet, the second outlet comprising a convergent divergent nozzle configured to accelerate cooling air exhausted from the second outlet to a velocity greater than air exhausted from the first outlet.

2. A gas turbine engine according to claim 1, wherein the cooling nozzle comprises a third outlet provided between the first and second outlets, the third outlet being configured to exhaust air at a velocity less than the second outlet, and greater than the first outlet.

3. A gas turbine engine according to claim 2, wherein the third outlet comprises a convergent divergent nozzle configured to accelerate cooling air exhausted from the third outlet to a velocity greater than air exhausted from the first outlet, and less than air exhausted from the second outlet.

4. A gas turbine engine according to claim 3, wherein the second and third outlets each comprise a respective divergent section downstream of a convergent section, wherein the divergent section of the second outlet diverges to a greater degree than the divergent section of the third outlet.

5. A gas turbine engine according to claim 1, wherein the first outlet comprises a restrictor configured to restrict outlet velocity of the first outlet to a velocity lower than at least the outlet velocity of the second outlet.

6. A gas turbine engine according to claim 1, wherein the main fluid flow exhaust nozzle is annular.

7. A gas turbine engine according to claim 6, wherein the cooling nozzle is annular and is configured to provide cooling to an annularly inner surface of the main fluid flow exhaust nozzle.

8. A gas turbine engine according to claim 1, wherein the main fluid flow exhaust nozzle comprises a variable area nozzle.

9. A gas turbine engine according to claim 1, wherein at least one of the outlets of the cooling nozzle has a variable geometry.

10. A gas turbine engine according to claim 1, wherein the cooling nozzle is configured to provide an outlet flow generally parallel to the main core flow.

* * * * *